3,285,776
HIGH D.E. SYRUP AND METHOD OF MAKING SAME
Barrett L. Scallet, Clayton, and Irving Ehrenthal, University City, Mo., assignors to Anheuser-Busch, Incorporated, St. Louis, Mo., a corporation of Missouri
No Drawing. Filed Apr. 2, 1962, Ser. No. 184,506
9 Claims. (Cl. 127—30)

This invention relates to the production of syrup by hydrolysis and alkali treatment of starch, and more specifically relates to sweeter high dextrose equivalent (D.E.) corn syrups and methods of making same.

Heretofore, starch syrups have been produced by hydrolysis of starch with mineral acids under pressure, by acid and single enzyme conversions, and acid and dual enzyme conversions. All of these syrups have certain commercial uses and are satisfactory for certain purposes. However, all of the present processes have certain limitations, among these being a bitter taste in the acid converted syrup above 58–60 D.E., and the increased percentage of dextrose and the subsequent danger of crystallization due to the high dextrose concentration in the acid and single enzyme conversion syrups when the conversion is above 65 D.E. The acid and dual enzyme conversions have been carried to slightly above 70 D.E. on a commercial basis and, although the resultant syrup is yeast fermentable to the extent of about 80% to 90% of the total carbohydrate material, the content of rapidly fermentable sugars is not as high as is often desired by the user, as for example in baking.

One of the principal objects of the present invention is to provide a novel syrup of high sweetness having above about 80 D.E. with a minimum amount of impurities, said syrup being non-crystallizing upon long storage.

Another object of the present invention is to provide a sweet high D.E. non-crystallizing syrup, a high percentage of the fermentables in said syrup being rapidly fermentable by yeast.

Another object of the present invention is to provide a very sweet tasting syrup having a high dextrose equivalent, and a portion of ketose sugars, principally fructose. Still another object is to provide a sweet non-crystallizing syrup that is free from objectionable color and impurities.

A further object of the present invention is to provide a process for producing the hereinbefore described syrup in which an acid converted starch syrup is treated with a high glucose producing enzyme and alkali under carefully controlled conditions of pH followed by an ion exclusion or an ion exchange purification process or a combination of the two.

Still a further object is to provide a starch conversion process wherein a high glucose syrup is treated with an alkali at continuously controlled and maintained pH conditions to convert a portion of the glucose to levulose (fructose) to produce a very sweet tasting syrup without excessive amounts of degradation products or salt.

A further object is to provide an ion exchange column having a weak base anion exchange resin and a strong acid cation exchange resin through which the isomerized syrup is passed to remove the color and de-ionize the high D.E. syrup.

Another object of the present invention is to provide an ion exclusion column containing a strong acid cation exchange resin in the sodium form through which the isomerized syrup is passed to remove substantially all of the color and a major portion of other impurities.

Another object is to provide a corn conversion syrup having approximately 65–80% of the sweetness of pure sucrose on a solids basis when tasted in dilute solution.

Still another object of the present invention is to provide a commercially practical process of making a sweet syrup wherein a high D.E., high glucose substrate is isomerized at a pH of 8.5–9.5 with the pH control being continuous during the alkali treatment time of 1–5 hours whereby the glucose content is reduced to below 45%, the remainder of said glucose being converted to the sweeter fructose without the production of excessive amounts of degradation products which interfere with subsequent yeast fermentation when the syrup is used in baking or other fermentation processes.

These and other objects and advantages will become apparent hereinafter.

Briefly, the present invention comprises the isomerization of a high D.E., high glucose starch conversion syrup with a limited amount of alkali under continuously controlled and maintained pH conditions of about 8.5 to about 9.5 to produce a high D.E. syrup having less than about 45% glucose and at least about 10% fructose, which syrup is then passed through an ion exclusion and/or an ion exchange column to produce a noncrystallizing very sweet tasting syrup having a D.E. of about 70 to about 85, containing a substantial portion of rapidly fermentable sugars, and being free from objectionable color and impurities. The present invention further comprises the treatment of an acid converted corn syrup with an amyloglucosidase to produce the necessary high glucose substrate for the isomerization treatment. This invention further includes the high D.E. high fructose containing non-crystallizing syrup having a substantial portion of rapidly fermentable sugars, and the method of making same hereinafter described and claimed.

The initial step contemplated in the present invention is an acid conversion step which may be any conventional acid treatment of a starch suspension which is well known in the art. The acid conversion is carried to about 40 D.E.–50 D.E. although it can be varied between about 18 and about 55 D.E. Conversion to about 40–50 D.E. produces a practical commercial balance between economical and rapid conversion with a minimum amount of objectionable color, taste, etc. The next step involves treating the acid conversion product with a high glucose producing enzyme to produce a high glucose substrate.

The high glucose producing enzyme may be a fungal enzyme such as an amyloglucosidase. A suitable enzyme is "Diastase 69" or "Diastase 73" made by Rohm & Haas Company. Another suitable glucose producing enzyme is "Diazyme" made by Miles Chemical Co. The amount of enzyme used depends on the particular enzyme and also on the time that the syrup is exposed to enzyme treatment.

The enzymatic treatment preferably is carried out at the optimum temperature for the action of the chosen enzyme. Temperatures of from about 55° C. to about 60° C. appear to be the most favorable operating temperatures. However, if the temperature is too high, the enzyme will be inactivated and if it is too low, the reaction will not proceed to completeness or at a commercially practical rate.

The pH of the enzymatic reaction can vary from about 3 to about 7, but preferably is held between about 4.5 and 5.1.

The enzyme treatment preferably utilizes about 0.05% by weight of dry enzyme based on the dry solids (D.S.) of the system for a 48 hour conversion, although greater or lesser amounts can be used and the conversion time varied accordingly. About 0.5% enzyme is used if a liquid enzyme preparation is used, also on a D.S. basis. The foregoing amounts of enzymes are based on utilization of presently available products at the enzyme activity customarily provided. Although the enzyme will produce a D.E. of up to about 95, the reaction preferably is stopped at a D.E. of about 80 to control the percentage of glucose in the final product. However, an enzyme conversion product of about 70 to about 85 D.E. is suitable for the isomerization step.

Other methods of producing a high glucose containing substrate may be used but it is believed that the acid and amyloglucosidase enzyme conversion provided the most practical present day processing steps.

The high glucose substrate is treated with alkali to convert a portion of the aldose sugars to ketoses. Principally, a portion of the dextrose is converted to the sweeter sugar fructose. The alkali treatment is continued for 1–10 hours, preferably about 1 to about 5 hours at a temperature of about 60° C. to about 68° C. with the pH being continuously maintained during the alkali treatment at a value within the range of about 8.5–9.5. In the preferred commercial process, the alkali treatment is continued for about 4–4.5 hours at a temperature of 64–65° C. and a pH of 8.9–9.1.

The preferred alkali is sodium hydroxide. The minimum amount of sodium hydroxide is used, since excess alkali results in formation of salts and degradation products which must be removed by the ion exclusion or ion exchange column, thus decreasing the capacity of said column. Excess amounts of alkali also produce organic acids which inhibit yeast fermentation when the syrups are used in baking. If the total amount of alkali is initially added rapidly to the syrup, it has the effect of raising the pH to a very high level and produces excessive amounts of degradation products. The pH then drops during the reaction and isomerization is slowed. Thus it is essential to the present invention that the pH be continuously controlled and maintained within the range of 8.5–9.5, preferably 8.9–9.1, during the isomerization. Furthermore, if the pH drops too low, below 8.5, the conversion of glucose to fructose is slowed considerably or stopped. Since the alkali is being continuously consumed and neutralized by the organic acids produced, it is necessary that alkali continuously be added to maintain the pH at the predetermined level.

The amount of alkali used on a dry solids basis (D.S.B.) is expressed in grams of alkali per gram of dry solids and varies from about 0.001 to about 0.025.

The high glucose syrup is carbon treated and filtered before being treated with alkali.

The product syrup recovered from the isomerization treatment has about the same D.E. as the entering syrup, namely from about 70 to about 85 D.E. However, the isomerized syrup contains less than about 45% glucose so that it is non-crystallizing on standing, whereas the high glucose entering syrup contained 55–75% anhydrous glucose on a dry basis, and would crystallize very rapidly, usually within a week when left at room temperature.

The product syrup also contains about 10–23% fructose and a total of about 15–33% ketose sugars instead of the corresponding aldose sugars. The ketose sugars are much sweeter tasting than are the corresponding aldose sugars, and are more nearly equivalent to sucrose. Since corn syrups are much cheaper than sucrose, this is an important economic advantage to the manufacturer and to the user.

The following taste tests, Table I, demonstrate the relative sweetness of the syrups of the present invention and of presently available commercial corn syrups and dextrose compared to sucrose, using sucrose as 100%. Dilute solutions were used in these tests.

Table I

| Syrup | D.E. | Percent of Sweetness of Sucrose |
| --- | --- | --- |
| Present Invention | 70–85 | 65–80 |
| Acid and One Enzyme | 63 | 55 |
| Acid and Dual Enzyme | 71 | 60 |
| Anhydrous Dextrose | 100 | 70 |

The isomerized syrups also contain 5–20% maltose and about 15% of other sugars. Among the ketoses is about 3–5% of a component which is believed to be psicose.

The isomerized syrup has about 70–85% of its carbohydrates yeast fermentable, and only about 3–5% of the fermentables are lost compared to the fermentables in the high glucose syrup.

The important aspect of the percentage of fermentables is that, in the present syrups, the major portion of the fermentables are rapidly fermentable by the yeast. In ordinary syrups, the fermentables include considerable amounts of maltose which are slowly fermentable by yeast. The slow fermenting syrups are satisfactory in the conventional sponge dough process, but do not perform well in new continuous baking processes, such as brew processes.

Both glucose and the fructose are rapidly fermentable by yeast and thus it is apparent that the present syrups which contain only slightly less than 45% glucose and from 10–23% fructose provide considerably more material which is rapidly fermentable than prior syrups which at most, if they were non-crystallizing, contained less than 45% of glucose. Thus the present syrups contain no more total fermentables, in some cases less, than prior syrups, but more of the fermentables in the present syrup are rapidly fermentable by yeast. Therefore, the present syrups can be utilized in new continuous baking processes, whereas most of the prior syrups are not useful in these processes. Sucrose, however, is very suitable in continuous baking processes, since the yeast inverts it into dextrose and fructose.

The terms glucose and dextrose are used interchangeably throughout the present application and the glucose is that referred to in the art as D-glucose.

Of the total fermentables in the present syrups, the major portion is dextrose and fructose which are rapidly fermentable by yeast. The present syrups contain at least 50% rapidly fermentable sugars and preferably at least 60% rapidly fermentable sugars.

The isomerized syrup contains only about 1% or less of salt which must be removed by the ion exchange or ion exclusion treatment. If much more salt were present, it would be uneconomical under present conditions to use the ion exchange or ion exclusion columns, which are necessary to remove the color, organic acids, etc. from the isomerized syrup.

In one purification method, the product from the isomerization reaction is passed immediately to an ion exchange column which consists of a weak base anion exchange resin such as "XE–168" made by Rohm & Haas Company, and a strong acid cation exchange resin such as "Amberlite 200" also made by Rohm & Haas. The weak base anion exchange resin is extremely important and removes the color and organic acid anions from the syrup. The syrup enters the column at a pH of 8.5–9.5 and leaves at a pH of 5.8–6.5 at the rate of about 0.2–0.5 gallon per cubic foot of resin per minute. The ion exchange column also removes the ash from the isomerization product. In other respects, the syrup from the ion exchange column is identical to the syrup entering from the isomerization tank. The color of the syrup entering the column is dark reddish brown, while the final product is substantially colorless, or at most, a light amber color. The syrup which does not have the ion exchange treatment inhibits yeast fermentation and thus is not suitable for baking. Although the specific impurities in the isomerized but unpurified syrup which cause this have not been identified at the present time, they are obviously of ionic nature since they are removed by ion exchange treatment.

In an alternate purification step, instead of the foregoing ion exchange treatment of the isomerized syrup, the high glucose syrup from the isomerization reaction is treated in an ion exclusion process to remove the impurities. A system is used which utilizes a resin which separates the impurities so that the salts and other impurities come out of the column before the purified syrup and are thereby separated from the syrup. The system can be operated as a batch process or as a continuous process when appropriate equipment is used.

The ion exclusion column contains a strong acid cation exchange resin in the sodium form such as "Dowex 50 WX-4" of Dow Chemical Company. The resin is a polystyrene divinylbenzene having 4% cross divinylbenzene linkages and of 50–100 mesh. The isomerized syrup is passed through the column at the rate of 0.5 gallon per square inch of cross sectional area of the column. The porous resin absorbs the syrup, but retains the impure degradation products of ionic form on the outer surfaces from which they are washed by water which is passed through the column after the syrup is added. The syrup leaves the column substantially clear of a brown color of the entering syrup.

The product from the ion exclusion column is concentrated and may be carbon treated to remove further color, if desired.

Also, the product from the ion exclusion column can be passed to an ion exchange column containing a weak base anion exchange resin and a strong acid cation exchange resin (as hereinbefore described) to remove further amounts of salt, etc.

By maintaining the isomerization reaction at about pH 9, loss of fermentables during the isomerization treatment is minimized, since the formation of known organic acids from the fermentable sugars during the isomerization treatment also is minimized. Although a small amount, less than 5%, of fermentables may be lost by continuously maintaining the pH at between 8.5–9.5, the large amount of fructose produced from the glucose and the increased sweetness of the resultant syrup more than compensates for the loss of fermentables. The overall loss of fermentables from the initial high glucose syrup to the final sweet syrup should not exceed about 1–5%. Also, the increased amount of rapidly fermentable material present in the syrup of this invention is particularly significant in the new continuous baking processes as hereinbefore discussed in detail.

The higher the glucose content of the substance prior to isomerization, the higher the amount of fructose that is theoretically possible. Thus it is desired to have a maximum amount of glucose in the substrate commensurate with the final syrup having less than 45% glucose. For some applications, a final syrup having as much as 52% glucose is satisfactory, if the syrup is to be used within a month.

The following Example I shows a preferred method for producing a product contemplated by the present invention.

EXAMPLE I

A starch slurry of about 23° Bé. is hydrolyzed with hydrochloric acid, in a manner well known to the art, to 42 D.E. The neutralized liquor is filtered with a filter aid and concentrated to 55% solids. The pH of the liquor is adjusted to about 4.8. The 42 D.E. acid converted syrup is treated with 0.3% (D.S.B.) of an amyloglucosidase enzyme ("Diastase 69") for 56 hours at 57° C., after which the enzyme is inactivated. The resultant syrup has a D.E. of 81.4 and a glucose content of 70.3. The syrup is treated with sodium hydroxide at 65° C. for 4 hours to produce syrup having the composition shown in the following table, Table II. The temperature and pH are continuously controlled and maintained at the specific levels.

*Table II*

Run No. 50:
- Substrate (mls.) _____ 250
- pH _____ 9.0
- Hours _____ 4
- Total ketose (percent) _____ 27.1
- Fructose (percent) _____ 20.8
- Psicose (percent) _____ 3.6
- Total base used (gms.) _____ 1.5

EXAMPLE II

1% carbon is added to a high glucose syrup having a D.E. of 78.9, a percentage of glucose of 70.5 and 80% fermentables and the syrup is filtered. The temperature of the high glucose syrup is raised to 65° C. and the pH is adjusted to 9.2 and maintained at that pH for 4 hours. 0.01788 gram of sodium hydroxide per gram of dry solids is added to the syrup during the isomerization. The finished product has 28.3% ketose of which 21.4% is fructose, 40% glucose, 75% fermentables and 3.7% psicose. This syrup is passed to an ion exchange column at a pH of 9.0 and a temperature of 65° C. and passed through said column at the rate of 0.5 gallon per minute per cubic foot of resin. The column contians a weak base anion exchange resin and a strong acid cation exchange resin. The syrup passes from the column at a pH of 5. There is substantially no ash, and no salt and no organic acids in the final syrup. The syrup is concentrated to 43° Bé.

The foregoing syrup is non-crystallizing upon long standing, has a D.E. of 78.9, 75% fermentables and is extremely sweet since it contains 28.3% ketose of which 21.4% is fructose.

The following table, Table III, shows further results obtained from other runs using various isomerization conditions and various substrates.

*Table III*

| No. | Isomerization Conditions | | | | | Finished Syrup Analysis | | | | Substrate | | |
|---|---|---|---|---|---|---|---|---|---|---|---|---|
| | pH | Adj. | Reaction Time, hrs. | Temp., °C. | Gm./Alkali Gm., D.S. | Ketose | Fructose | Psicose | Glucose | D.E. | Percent Glucose | Fermentables |
| | 9.5 | Cont | 3½ | 65 | 0.01622 | 26.4 | | | | 74.7 | 54.6 | 79.8 |
| | 9.5 | Cont | 4 | 65 | 0.01931 | 27.5 | 16.6 | 5.4 | 35.2 | 74.7 | 54.6 | 79.8 |
| 2 | 9.5 | Cont | 3½ | 65 | 0.01986 | 32.9 | 18.5 | 5.4 | | 75.2 | 66.0 | 86.1 |
| | 9.5 | Cont | 4 | 65 | 0.02350 | 30.0 | | | 33.5 | 75.2 | 66.0 | 86.1 |
| 3 | 9.0 | Cont | 2½ | 65 | 0.00585 | 19.4 | | | | 78.9 | 70.5 | |
| | 9.0 | Cont | 3 | 65 | 0.00654 | 21.3 | | | | 78.9 | 70.5 | |
| | 9.0 | Cont | 3½ | 65 | | 23.4 | | | | 78.9 | 70.5 | |
| | 9.0 | Cont | 4 | 65 | 0.00814 | 25.2 | 21.2 | 4.0 | 45.0 | 78.9 | 70.5 | |
| 4 | 9.0 | Cont | 4 | 65 | 0.00933 | 25.6 | 19.6 | 3.8 | | 78.9 | 70.5 | |
| 5 | 9.2 | Cont | 4 | 65 | 0.01788 | 28.3 | 21.4 | 3.7 | | 78.9 | 70.5 | |
| 6 | 9.0±1 | Cont | 4 | 65 | 0.0034 | 22.7 | | | | | 70 | |
| | 9.0±1 | Cont | 4½ | 65 | 0.0042 | 24.6 | | | | | 70 | |
| | 9.0±1 | Cont | 5 | 65 | 0.00495 | 25.7 | | | | | 70 | |
| | | None | 5+1 | 65 | 0.00495 | 27.4 | 20.2 | 3.9 | | | 70 | |
| 7 | 8.5 | Cont | 4 | 65 | 0.00310 | 14.8 | | | | 78.9 | 70.5 | |
| 8 | 9.0 | Single | 4 | 65 | | 12.6 | | | | 78.9 | 70.5 | |

In Run No. 6, the continuous adjust of pH was stopped after five hours and the syrup was allowed to set in the tank for an additional hour during which the pH dropped to 8.5, but the isomerization continued slowly. This experimental procedure follows contemplated plant operations where the syrup may be held in the isomerization tank after the addition of alkali has stopped, or there may be a lag in emptying the isomerization tank or in passing the product to the clarification equipment, etc.

In Run No. 8, only a single pH adjustment was made to 9.0 and no more alkali was added. The total ketose in this run was only 12.6 which is well below the minimum ketose of 15% contemplated by the present invention.

EXAMPLE III

A 44 D.E. acid converted liquor containing 84.6 pounds of dry substance at 29.3 Bé. is treated with 0.1% (D.S.B.) of "Diazyme" powder at pH 5.0 and at 57° C. for 22 hours. The resultant liquor has a D.E. of 83.1 and a glucose content of 70.5 The temperature of the liquor is raised to 65° C. to inactivate the enzyme. 0.3% carbon (D.S.B.) is added to the foregoing liquor and is filtered. The temperature of the high glucose liquor is raised to 65° C. and the pH adjusted to 9.0 and maintained at that temperature and pH for 4½ hours. A total of 0.0079 gm. of sodium hydroxide per gram of dry solids is added to the liquor during the isomerization. The finished product contains 30.2% ketose (D.S.B.) of which 21.0% is fructose. The finished product also contains 44% glucose. A portion of this liquor is then passed through a monobed column containing "XE-168" and "Amberlite 200" at the rate of 0.2–0.5 gallon per cubic foot of resin. The liquor from the column is substantially free of ash and organic acids and is light in color. The liquor is concentrated to 43° Bé.

EXAMPLE IIIa

A second portion of the liquor from the isomerization of Example III is passed through an ion exclusion column containing "Dowex 50 WX-4," a strong acid cation exchange resin in the sodium form. The resin is 4% crosslinked polystyrene divinylbenzene and is 50–100 mesh. The liquor is passed through the column at the rate of 0.5 gallon per minute per square foot of cross sectional area of the column. Substantially all of the color and the major portion of the ionic impurities are removed from the liquor.

If further classification and purification of the liquor from the ion exclusion of Example IIIa is desired, it is passed through an ion exchange column containing a weak base anion exchange resin and a strong acid cation exchange resin.

The syrup of Example III was compared with commercially available 70:30 and 60:40 enzyme conversion corn syrup:sucrose blends in continuous mixer dough processes in small-scale baking tests. The syrup of Example III used alone was found to perform slightly better than either of the two syrup blends on an equal solids basis in the two continuous baking processes which are most widely used commercially at the present time: the "Domaker" process of Wallace and Tiernan Co., and the "Amflow" process of American Machine and Foundry Co. No precently available commercial syrup made entirely from corn starch can be used satisfactorily in these continuous baking processes. In the "Amflow" process, the syrup of Example III performed equally as well as commercial dextrose on an equal solids basis.

The invention is intended to cover all changes and modifications of the examples of the invention herein chosen for purposes of the disclosure, which do not constitute departures from the spirit and scope of the invention.

What is claimed is:

1. A non-crystallizing starch conversion syrup having a D.E. of from about 70 to about 85, from about 15% to about 33% ketoses, at least 10% of said ketoses comprising fructose, and glucose in the range of about 33.5 to 45.0% by weight on a dry substance basis, said syrup being essentially free of organic acids and ash.

2. A non-crystallizing substantially clear corn type starch conversion syrup having a D.E. of about 70 to about 85, from about 15 to about 33% ketoses, about 10 to about 23% of said ketoses comprising fructose, at least 55% of its carbohydrates being rapidly yeast fermentable, glucose in the range of about 33.5 to 45.0% by weight on a dry substance basis, and about 5–20% maltose, said syrup being essentially free of organic acids and ash.

3. A corn type starch conversion syrup having about 80 D.E., about 27% ketoses, about 21% of said ketoses comprising fructose, and glucose in the range of about 33.5 to 45.0% by weight on a dry substances basis, the fructose:glucose ratio being at least 0.45, about 80% of its carbohydrates being yeast fermentable, said syrup being about 70% as sweet as pure sucrose and being essentially free of organic acids and ash, said syrup also being non-crystallizing on standing.

4. A method of making a starch conversion syrup including the steps of treating a starch conversion substrate having a D.E. of about 18–55 with an amyloglucosidase, recovering a product having a D.E. of above 70 and above 55% glucose, isomerizing said product with about 0.001 to about 0.025 gram alkali per gram of dry solids, continuously maintaining the pH of said product between 8.5 and 9.5 during the isomerization treatment, recovering a non-crystallizing sweet starch syrup having a D.E. above 70, less than 45% glucose, at least 15% ketoses of which at least 10% is fructose, and at least about 55% rapidly yeast fermentable carbohydrates, and purifying said syrup.

5. The method defined in claim 4 wherein said non-crystallizing syrup is passed through an ion exchange column including a weak base anion exchange resin and a strong acid cation exchange resin in the purifying step.

6. The method defined in claim 4 wherein said non-crystallizing syrup is passed through an ion exclusion column including a sulfonated styrene divinyl benzene resin of about 4% divinylbenzene crosslinkage and of about 50–100 mesh.

7. A method of making a high D.E. starch conversion syrup comprising the steps of treating a starch slurry with acid to produce a starch conversion syrup having a D.E. of 18–55, treating said acid conversion syrup with an amyloglucosidase enzyme to produce a syrup having a D.E. of about 70–85 and including about 55–70% glucose and about 5–20% maltose, treating said enzyme conversion syrup with an alkali for about 1 to about 5 hours at a temperature of about 60–68° C., continuously maintaining the pH during said alkali treatment at a predetermined value between 8.5 and 9.5, recovering a syrup having a D.E. of about 70–85 and including less than about 45% glucose and above about 15% ketoses, clarifying said syrup and recovering a non-crystallizing sweet syrup having a D.E. of about 70 to about 85, said syrup being essentially free of organic acids and ash.

8. The method defined in claim 7, wherein said acid converted syrup has a D.E. of about 42 and the non-crystallizing final syrup product includes from about 25–33% ketose of which more than about 20% are fructose, and above about 75% fermentables.

9. A non-crystallizing starch conversion syrup having a D.E. above about 70, at least about 15% ketoses, at least 10% of said ketoses comprising fructose, glucose in the range of about 33.5% to 45.0% by weight on a dry substance basis, and at least about 55% rapidly yeast fermentable carbohydrates, said syrup being essentially free of organic acids and ash.

References Cited by the Examiner

UNITED STATES PATENTS

| | | | |
|---|---|---|---|
| 2,354,664 | 8/1944 | Cantor et al. | 127—36 |
| 2,871,147 | 1/1959 | Smith | 127—46.1 XR |
| 2,890,972 | 6/1959 | Wheaton | 127—46.2 |
| 3,044,905 | 7/1962 | Lefevre | 127—46 |
| 3,067,066 | 12/1962 | Ehrenthal et al. | 127—38 |

MORRIS O. WOLK, *Primary Examiner.*

E. SZOKE, M. E. ROGERS, *Assistant Examiners.*